(No Model.) 2 Sheets—Sheet 1.
S. W. PARKER & H. BLACKMAN.
APPARATUS FOR DISINFECTING BALED RAGS, &c.
No. 309,488. Patented Dec. 16, 1884.
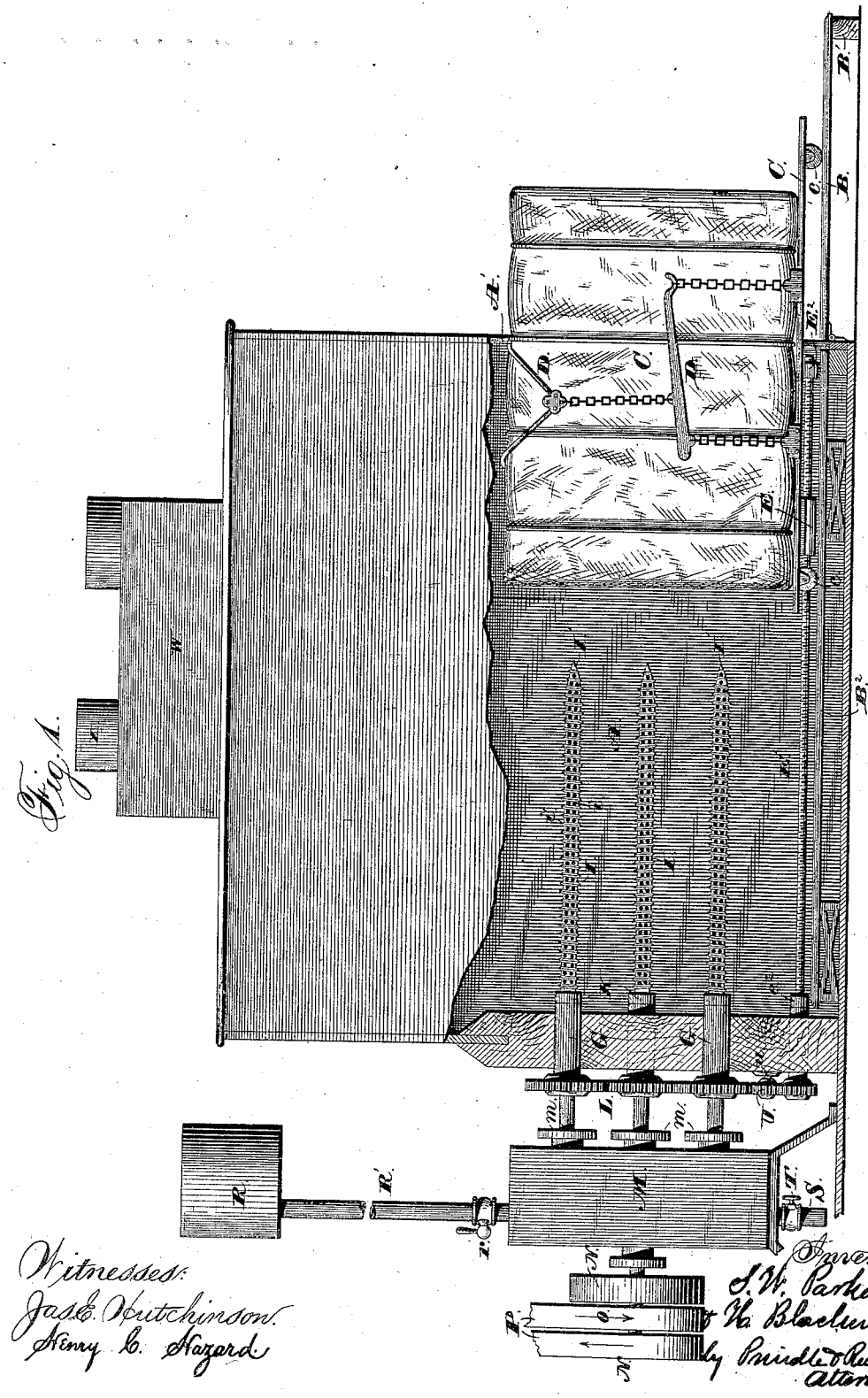
Fig. A.
Witnesses:
Jas. E. Hutchinson.
Henry C. Hazard.
Inventors
S. W. Parker
H. Blackman
by Prindle & Russell
Attorneys (No Model.) 2 Sheets—Sheet 2.
S. W. PARKER & H. BLACKMAN.
APPARATUS FOR DISINFECTING BALED RAGS, &c.
No. 309,488. Patented Dec. 16, 1884.
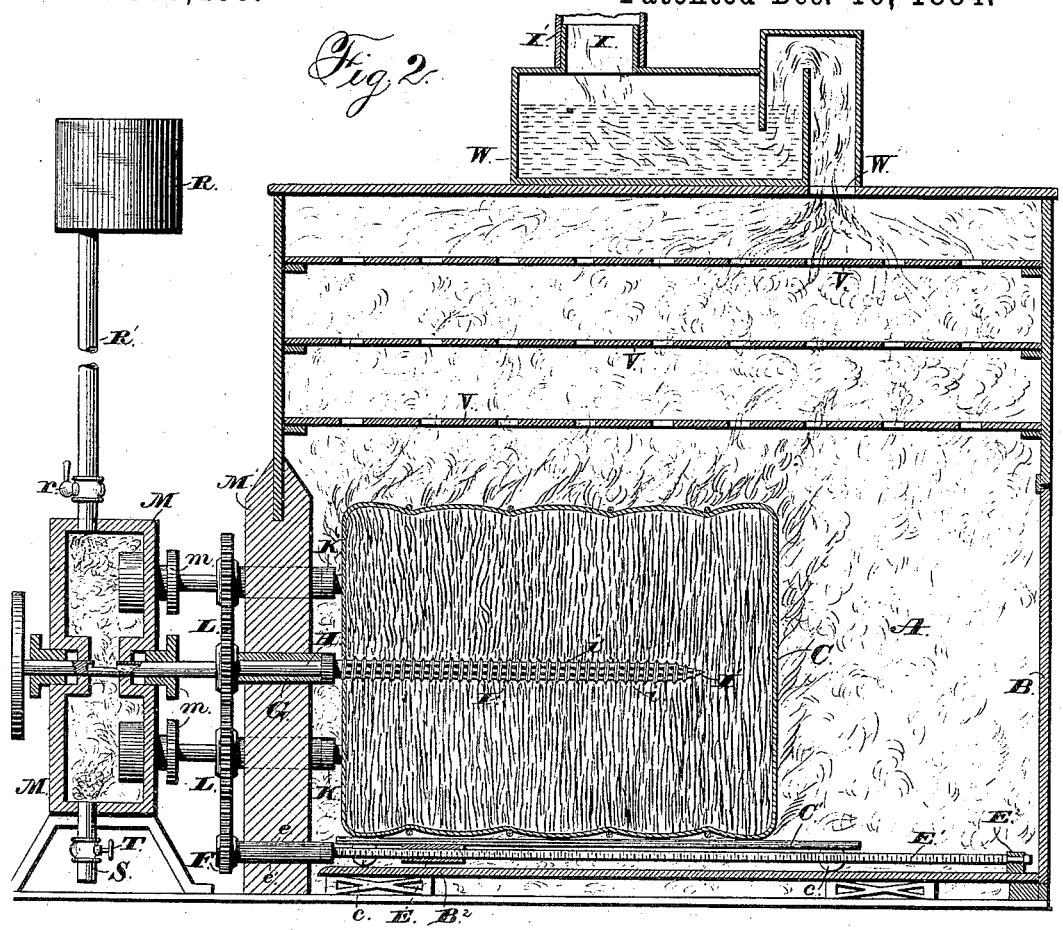
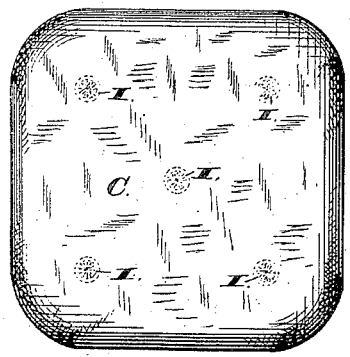
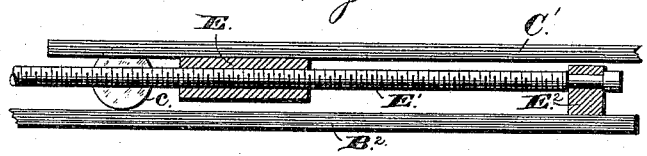
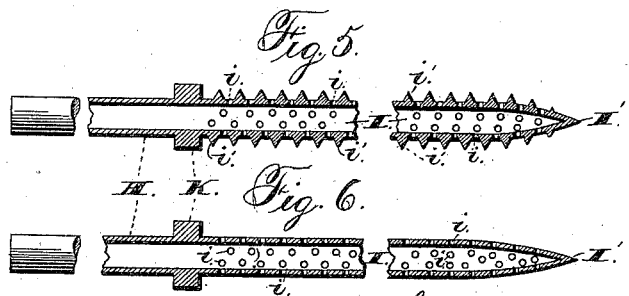

United States Patent Office.

SAMUEL WEBBER PARKER AND HENRY BLACKMAN, OF NEW YORK, N. Y.

APPARATUS FOR DISINFECTING BALED RAGS, &c.

SPECIFICATION forming part of Letters Patent No. 309,488, dated December 16, 1884.

Application filed October 2, 1884. (No model.)

*To all whom it may concern:*

Be it known that we, SAMUEL WEBBER PARKER and HENRY BLACKMAN, of New York city, in the county of New York and State of New York, have invented certain new and useful Improvements in Apparatus for Disinfecting Baled Rags and other Fibrous Material; and we hereby declare that the following is a full, clear, and exact description thereof, reference being had to the accompanying drawings, in which—

Figure 1 shows a view in side elevation of our apparatus, a portion of the side wall of the disinfecting-chamber being broken away to show the interior arrangement of parts; Fig. 2, a longitudinal vertical central section of the same; Fig. 3, a detail view in elevation of the bale, showing the relative positions of the nozzles thrust into it; Fig. 4, a detail sectional view showing the means for feeding forward and back the bale-carrying carriage; Fig. 5, a detail longitudinal sectional view of one of the screw-injector tubes, and Fig. 6 a similar view showing a modified form of injector-tube.

Letters of like name and kind refer to like parts in each of the figures.

In the disinfecting of rags and other fibrous materials to render inert and harmless any decaying or deleterious animal or vegetable matter, and to kill and destroy all disease-germs existing in the material or among its fibers with the apparatus as heretofore known and used, it has been necessary, in order to insure complete disinfection, to unbale, loosen, and spread out the material, to expose it sufficiently to the action of the disinfectant gas or liquid. Such unbaling and loosening or spreading of the material before it has been disinfected is very dangerous to the life of the workmen or any one in the vicinity of the place where it is done, because it not only exposes any deleterious or decaying animal or vegetable matter which may be in or upon the material and its fibers, but it also sets free to float in the air any disease-germs that may be held in the material while it is compressed in the bale. Where, as when the rags or other fibrous materials are imported from Egypt or other foreign countries, the quarantine regulations require that they shall be thoroughly and effectually disinfected, there must, if any of the processes of disinfection heretofore known are used, be an unbaling and loosening of the material, and a subsequent rebaling thereof for transportation after the disinfecting is finished. In such case there is the danger to the workmen and others in the neighborhood, as set forth above, consequent upon the opening of the bale before the material is disinfected, and there is also considerable expense, labor, and loss of time caused by the necessary operations of unbaling and baling up again.

It is the object of our invention to provide an apparatus which, in its operation, shall avoid all these objections to the processes heretofore known and used, which can be applied directly to the material while still in the bale, and when so applied will do its work of disinfecting effectually and completely with rapidity and without endangering the lives of those operating it or being in its neighborhood; and to this end our invention consists in the construction, arrangement, and combination of parts, as hereinafter specified.

In the drawings, A designates the main or disinfecting chamber, which is to be made of wood, metal, or other material, as desired. One end of this chamber is provided with an opening, A', and a door, B, hinged at its lower edge or side, and adapted to be swung up to close the opening tightly. This door is so hinged that when swung down, as shown in Fig. 1, with its outer end supported by a block or knob, B', attached to it and resting upon the floor or surface supporting the apparatus, it will form a continuation of the false bottom B² of chamber A.

For supporting and carrying the bale C of material to be placed in the chamber, we have provided a car or carriage, C', consisting of a platform supported upon suitable wheels or casters, $cc$. While the carriage is wholly within the chamber A, as shown in Fig. 2, these wheels rest upon the false bottom B². When the carriage is rolled back and out of the chamber, as shown in Fig. 1, they roll upon the upper face of door B, swung down. The carriage is, as shown, provided on each side with a clamping or holding device, D, adapted to hold a bale firmly and immovably.

To cause the carriage to move into and out of the chamber, we provide upon the under side of its platform a fixed sleeve, E, interiorly threaded to fit the screw E′, journaled at one end near the opening in the chamber end in a stationary block, E², fixed upon the false bottom B² or any portion of the chamber-casing. From this end the screw extends along under the car, through the screw-sleeve, and to the other end of the chamber. At this end it is provided with a cylindrical shank, $e$, which is journaled in and passes through a journal-bearing, $e'$, extending through the wall of the chamber. A collar, $e^2$, on the screw bears against the inner end of this journal-bearing, and upon the outer end of shank $e$, bearing against the other end of the journal, is fixed a pinion, F, which is to be driven in either direction, as desired, by means to be hereinafter described. Above this journal-bearing there is a series of similar long journal-bearings, G G, passing through and supported in the thick wall of the chamber. There can be any number of these, but in the drawings we have shown five. Of these the middle one is in line with the center of the bale, supported and held on the rolling carriage. The others are arranged at the corners of a square of which the first one is the center, and of which two sides are horizontal. Journaled in these bearings are the hollow shanks H H of the hollow or tubular screws I I, pointed at their outer ends, I′ I′. The bore of each of these screws extends, as shown best in Fig. 5, well up into the point, but at the extreme point is closed. Each screw is provided with a number of small openings or perforations, $i\ i$, situated between the threads $i'\ i'$. These perforations are made as numerous as possible, and extend from the fixed collar K, bearing against the inner end of the bearing, to the point of the screw.

Upon the tubular shanks H H of the screws, just outside of the wall of the chamber, and bearing against the outer ends of the bearings G G, are fixed the gear-wheels L L. The one on the shank of the central screw gears with and drives all the rest.

At a short distance from the end of the chamber A is the hollow chamber or receptacle M, into which is to be forced in any desired way a disinfectant, either in the form of gas or liquid. The tubular shanks H H of the screws project through the wall M′ of this chamber or receptacle, passing through suitable stuffing-boxes, $m\ m$, adapted to prevent leakage, and their bores communicate with the chamber interior. The shank of the middle screw is continued through the opposite wall of said chamber and a suitable stuffing-box, and on its closed or solid projecting end is provided with two fixed pulleys, N N, and with a loose pulley, O, loosely journaled upon it between them. Two belts, P P′, driven in opposite directions, as shown by the arrows, can be shifted over these pulleys in the well-known way, to cause the middle shank and screw to be driven in either direction, as desired. The threads on the other screws are inclined in a direction opposite to that of the thread on the central screw, because such other screws are driven in a direction opposite to that of the rotation of the central screw by the intermeshing gears.

To bring the bore of the central hollow screw-shank into communication with the interior of chamber M, an opening is provided in that portion of the shank which passes through the chamber. Several of such openings can be made in the screw-shank. Whatever disinfectant is used, whether gas or liquid, it is to be caused to enter and fill this chamber under pressure, so that it will be forced out through the tubular shanks, the hollow screws, and the perforations in the latter. We contemplate, where a liquid is to be used, providing an elevated tank or receiver, R, containing the liquid, and connected with the chamber M by a pipe, R′, provided with a suitable valve or stop-cock, $r$. Where a disinfectant in the form of gas or vapor is to be used, it can be forced by any desired means—as a pump or injector—through the pipe S into the chamber, the pipe being provided with a stop cock or valve, T, to shut off and turn on the disinfectant.

With one of the gear-wheels L on the shank of one of the lower screws meshes the pinion U, journaled on a stud, $u$, and gearing with the pinion F on the end of the shank of the carriage driving or feeding screw E′. This screw is constructed so that as the tubular perforated screws I I are turned, so as to screw them into anything brought against their points, it will, by the gearing described, be turned in the screw-sleeve on the carriage, so as to draw the latter inward toward the screws I I, thus feeding the bale upon the carriage up to and against the screw-points. This feeding of the bale forward is continued as the screws I I enter and are screwed into it.

The feeding-screw is preferably made with threads of less pitch than those of the other screws, and by the gearing is revolved more rapidly to compensate for this difference.

In the upper part of the main chamber A are shown several perforated shelves, V V, upon which, if desired, any material to be treated can be spread out and subjected to disinfecting gas or vapor passed up through the screens and layers of material thereon.

On top of the casing of the chamber A is a tank, W, nearly filled with disinfecting-liquid. A passage, W′, extends from the upper portion of chamber A up into the tank above the level of the liquid therein, and then is carried at its end down below the surface of such liquid. At its other end the tank W is provided through its top with a discharge-opening, X, and a suitable pipe or stack, X′, forming a continuation of the opening. With this construction all vapors or gases passing out of the closed chamber A through the passage W′ must pass through the disinfecting-liquid in the tank before escaping through opening X and stack X' into the open air. Any foul or deleterious gases arising from the material being treated in the tank will thus be rendered inert and harmless, and any disease-germs floating in the air or gas within the chamber will be killed or destroyed as the air or gas passes upward and outward through the disinfecting-liquid. However foul and disease-infected the material being treated may be, the air or vapor passing from the disinfecting-chamber through the tank and then escaping into the open air will be thoroughly disinfected and rendered harmless.

The operation of our apparatus is briefly as follows: The door of the disinfecting-chamber being open and the bale-carrying car being run out thereon, a bale is firmly clamped upon the car. The hollow perforated screws are then driven by the means described to rotate so as to screw into the bale when it is brought against their points. By the connecting-gear the feed-screw is at the same time driven to move the car and bale inward toward the revolving hollow screws. The bale is thus fed up to said screws as they work into it until they have penetrated it to their full lengths. When the screws have penetrated the bale to their full lengths, the driving-power is disconnected or stopped. Then the door having been swung up to close the chamber, a disinfectant, either in the form of a gas, liquid, or vapor, is forced into the receptacle or chamber M out through the hollow screw-shanks and screws, and caused to issue through the perforations in the screws in small jets in every direction, so that it will permeate every part of the mass of material in the bale. Where, as shown in the drawings, the injecting-screws are five in number, and arranged as described and shown, the center screw penetrates the center of the bale, and the others penetrate it at points upon the diagonal lines from the center of the bale end to its corners. Instead of five injecting-screws thus arranged, any desired number can of course be used. As the disinfectant is, as described, caused to penetrate and permeate the mass of the bale in every direction, it will, as it passes outward, come in contact with every portion of the material thereof, and will act upon every particle of deleterious or decaying animal or vegetable matter, and kill every disease-germ among the fibers. If any active disease-germ be loosened or liberated from among the fibers, to float in the air within the chamber, it will be killed either by the disinfectant vapor or gas issuing from the bale, or by the liquid in the tank above as it passes from the chamber out through it. When the bale has been a sufficiently long time subjected to the disinfecting process described above, the disinfectant fluid or vapor is turned off from chamber M, and the driving power or means is caused to drive the injecting-screws so as to withdraw them from the bale, the feeding-screw being thereby turned correspondingly, to withdraw the car and bale from the injectors. The door is then opened, and the car, with its bale, is caused, by the action of the feed-screw, to run out upon the door, so that the bale can be removed and a new one put in its place.

We do not herein claim any process of disinfecting rags and other fibrous material, as our process is fully covered by the claims in another application filed by us October 23, 1884, No. 146,309.

Having thus described our invention, what we claim is—

1. In an apparatus for disinfecting rags or other fibrous materials while in the bale, in combination with a perforated tubular injecting-nozzle, a car or carriage for carrying the bale, and devices for positively moving the carriage toward and away from the nozzle, substantially as and for the purpose described.

2. In an apparatus for disinfecting rags or other fibrous materials while in the bale, a series of pointed tubular perforated nozzles, a device for supplying to the nozzles disinfectant under pressure, a traveling car or carriage provided with a clamp or holder for the bale, and a device for causing the bale-carrying car to move up to and away from the nozzle, all substantially as and for the purpose described.

3. In a disinfecting apparatus, a rotary hollow perforated screw adapted to be screwed into a bale of the material to be disinfected, substantially as and for the purpose described.

4. In a disinfecting apparatus, a rotary hollow perforated screw, in combination with a device or devices for supplying disinfectant under pressure to the bore of the screw, substantially as and for the purpose described.

5. In a disinfecting apparatus, a series of rotary tubular perforated screws, adapted to be screwed into a bale of the material to be disinfected, in combination with a source of supply of disinfectant under pressure, connected with the bores of the screws, substantially as and for the purpose described.

6. In combination with the chamber M, the series of rotary tubular perforated screws, having their bores in communication with the interior of the chamber, substantially as and for the purpose described.

7. In combination with the disinfectant-receiving chamber M, the series of rotary tubular screws having their bores in communication with the interior of the said chamber, and gearing for rotating them, to screw them into a bale of the material to be treated, substantially as and for the purpose described.

8. In a disinfecting apparatus for rags and other fibrous materials while in the bale, in combination with the series of rotary tubular perforated screw-nozzles, mechanism for feeding the bale of material up to the nozzles as they rotate, substantially as and for the purpose described.

9. In a disinfecting apparatus, in combination with a series of rotary tubular perforated screw-nozzles, a carriage provided with a clamp or holder for holding a bale of material to be treated, a screw nut or sleeve attached to the carriage, and a rotary screw passing through such screw sleeve or nut, substantially as and for the purpose described.

10. In a disinfecting apparatus, in combination with the series of tubular perforated injecting-screws, mechanism or gearing for rotating one of the screws in either direction, gear-wheels on the shanks of the other screws, a gear-wheel on the shank of the driven screw, meshing with such wheels, a bale-carrying car or carriage, a screw nut or sleeve on the same, a screw passing through such nut or sleeve, a pinion on the shank of this screw, and connecting-gearing between this pinion and the gear on one of the screw-shanks, substantially as and for the purpose described.

11. In a disinfecting apparatus, in combination with the disinfectant-receiving chamber M and the disinfecting-chamber A, the series of journal-bearings in the wall of the latter, the hollow perforated rotary screws in the disinfecting-chamber, having their hollow shanks journaled in such bearings and extending through them and through the wall or side of the disinfectant receiver or chamber, and mechanism for rotating the screws and feeding a bale of material to be treated up to and from the screws in the disinfecting-chamber, substantially as and for the purpose set forth.

In testimony whereof we have hereunto set our hands and seals in the presence of two subscribing witnesses.

SAMUEL WEBBER PARKER. [L. S.]
HENRY BLACKMAN. [L. S.]

Witnesses:
W. HAUFF,
E. F. KASTENHUBER.